(12) United States Patent
Thurin et al.

(10) Patent No.: US 10,633,241 B2
(45) Date of Patent: Apr. 28, 2020

(54) TASTING TAP

(71) Applicants: Benjamin Thurin, Bordeaux (FR);
Aurélien Guenerie, Saint-Caprais de Bordeaux (FR)

(72) Inventors: Benjamin Thurin, Bordeaux (FR);
Aurélien Guenerie, Saint-Caprais de Bordeaux (FR)

(*) Notice: Subject to any disclaimer, the term of this patent is extended or adjusted under 35 U.S.C. 154(b) by 0 days.

(21) Appl. No.: 16/096,927

(22) PCT Filed: Apr. 10, 2017

(86) PCT No.: PCT/FR2017/000071
§ 371 (c)(1),
(2) Date: Oct. 26, 2018

(87) PCT Pub. No.: WO2017/187028
PCT Pub. Date: Nov. 2, 2017

(65) Prior Publication Data
US 2019/0119095 A1    Apr. 25, 2019

(30) Foreign Application Priority Data
Apr. 27, 2016 (FR) .................................. 16 53730

(51) Int. Cl.
*B67D 3/04*    (2006.01)
*F16K 3/06*    (2006.01)

(52) U.S. Cl.
CPC ............... *B67D 3/047* (2013.01); *F16K 3/06* (2013.01)

(58) Field of Classification Search
CPC .................................. B67D 3/047; F16K 3/06
USPC .................................................... 222/153.09
See application file for complete search history.

(56) References Cited

U.S. PATENT DOCUMENTS

| 3,321,175 | A | * | 5/1967 | Epp | .................. | A01G 25/16 |
| | | | | | | 251/145 |
| 4,375,864 | A | | 3/1983 | Savage | | |
| 5,944,300 | A | * | 8/1999 | Gillard | .................. | B67D 3/043 |
| | | | | | | 251/187 |

(Continued)

FOREIGN PATENT DOCUMENTS

| EP | 0 962 421 A1 | 12/1999 |
| FR | 2 481 191 A | 4/1982 |
| GB | 240 575 A | 10/1925 |

OTHER PUBLICATIONS

International Search Report, dated Jul. 25, 2017, from corresponding PCT/FR2017/000071 application.

*Primary Examiner* — Jeremy Carroll
(74) *Attorney, Agent, or Firm* — Young & Thompson

(57) ABSTRACT

A tap for industrial use allows the collection of liquid samples. The tap is partially made up of a body crossed by a pipe and a control mechanism including, in particular, a handle and a shutter. In a closed position, the shutter entirely obstructs the hole of the pipe. In an open position, the shutter does not even partially obstruct the hole of the pipe. The tap is attached, in a closed position, to a container holding a liquid. An operator can, using the lever, switch the tap from a closed position to an open position, and vice versa, thus allowing the liquid to flow through the pipe according to variable flow rates ranging from a flow rate of zero in closed position to a maximum flow rate in open position. The pipe is removable to enable optimal cleaning of all the elements of the device.

20 Claims, 9 Drawing Sheets

(56) References Cited

U.S. PATENT DOCUMENTS

| | | |
|---|---|---|
| 6,321,948 B1 | 11/2001 | Bellon et al. |
| 7,721,755 B2 | 5/2010 | Smith et al. |
| 8,640,931 B2 | 2/2014 | O'Keefe, Jr. et al. |
| 2002/0014608 A1* | 2/2002 | deCler ................ B65D 47/263 251/149.9 |
| 2002/0074533 A1* | 6/2002 | DeCler ................ B67D 3/045 251/149.9 |

* cited by examiner

TASTING TAP

FIELD OF THE INVENTION

This invention relates to the field of taps for industrial use allowing the collection of samples of liquid or of sediment.

More particularly, this invention relates to the field of tasting taps in the wine-making field.

STATE OF THE ART

Traditionally, the taps used on containers of liquid have an airtight chamber filled with said liquid and a flow guide. Passing from the chamber to the flow guide is made possible by a system such as a valve system, for example.

The devices of the U.S. Pat. Nos. 7,721,755, 6,321,948 and 8,640,931 have this type of tap. The opening and closing of the taps presented is done by causing a mechanism to rotate that makes possible the connecting of the chamber with the flow guide.

The British patent application GB 240575 describes a tap that functions according to a similar principle, in which at least a portion of the flow guide is removable, so as to allow the installation of the tap on a container using a mallet, without deforming or breaking the flow guide. This flow guide is then used after installation of the tap on the container.

The drawback of these devices is twofold.

First of all, the airtight chamber of the tasting taps is likely to become clogged if the liquid with which the container is filled contains solid bodies. This is particularly true in the wine-making field: during wine-making periods, numerous solid bodies, such as, for example, skins, grape seeds, canes, are present in the liquid and can obstruct the flow zone between the chamber and the flow guide;

Then, liquid residue stagnates in the flow guide between two samples. This liquid in contact with air is likely to distort future collections of samples, which is particularly troublesome when it concerns the tasting of wine, for example.

The document EP-962,421 describes a stopper system attached to a container that comprises a body through which a hole passes for outflow of a liquid contained in the container. This outflow hole comprises a threading that makes it possible to screw on a stopper. The stopper system also comprises a control mechanism that has a shaft mounted to pivot in a hole that passes through the body. The control mechanism also comprises a handle connected to a front end of the shaft and a stopper attached to a rear end of the shaft and of sufficient dimensions to be able to block the outflow hole.

A tasting tap could be screwed into the outflow hole. However, the installing of such a tap by screwing is not easy and makes cleaning difficult.

The document FR-2,491,191 describes a device for withdrawing a liquid contained in a container. This device comprises a body that has a through-hole closed by a stopper and a removable pipe that is designed to be inserted into the through-hole. This removable pipe has an end that is designed to be clipped onto the stopper. To trigger the flow of the liquid to the outside of the container, the removable pipe is translated so that its end on which the stopper is clipped penetrates into the container.

This device is relatively complex and therefore costly. It does not permit sampling when the pressure in the container exceeds a value beyond which the operator does not have the force necessary to push the pipe inside the container. In addition, a serious malfunction can occur, if the stopper comes off inside the container, because of a solid particle contained in the container, for example.

DISCLOSURE OF THE INVENTION

The device according to the invention is an alternative to the industrial taps that already exist. It makes it possible in particular to facilitate the cleaning of its components and to preclude the retention of liquid in the flow guide. The samples are therefore not distorted by liquid coming from prior samplings that would have been retained in the flow guide, in contact with the air.

For this purpose, the invention has as its object a tasting tap attached to a container of a liquid, characterized in that it has:
  a body, by which said tap is attached to said container, through which a pipe hole and a shaft hole pass, each having an axis of revolution;
  a control mechanism that has:
    a shaft that is mounted to pivot in the shaft hole of the body in such a way as to pass through the body,
    a stopper that is movable between a closed position when the stopper totally blocks the pipe hole of the body and an open position when said stopper does not at all block said pipe hole, the stopper being connected to the shaft so as to be flattened against a rear face of the body,
    a controller designed to cause the shaft that is positioned in the area of a front face of the body to pivot;
  a removable pipe having dimensions that are slightly less than those of the pipe hole of said body, able to be inserted into said pipe hole, and having a tubular part, the pipe hole having a reduction in diameter to form a stop against which the pipe abuts;
  a locking/unlocking mechanism designed to occupy a locked state in which it immobilizes the pipe in the pipe hole and an unlocked state in which it allows the removal of the pipe.

Once the device according to the invention is attached to the container, an operator can act on the controller of the control mechanism to go from a closed position to an open position of the device, or the other way around. The rotation of the stopper that is integrally connected to the shaft that is driven in rotation by the controller thus makes it possible to unblock the pipe hole, which is blocked in closed position, or conversely to re-block the pipe hole, thus making possible the flow of liquid into the pipe, at variable flow rates, going from an absence of flow in closed position to a maximum flow attained in open position.

During the closing process, the stopper, in its movement of rotation, flushes the particles that could clog the tap. If certain solid bodies, for example skins and grape seeds or canes, are engaged in the pipe hole, they are pushed or sheared off by the stopper insofar as they do not exceed a threshold mechanical strength that depends in particular on the shape and on the material used to manufacture the stopper.

In one embodiment, the rim of the stopper puts the liquid in motion to flush the solid bodies more effectively than in the absence of a rim. In this embodiment, the reduction in the thickness of the stopper also makes it possible to prevent the accumulation of solid particles between the stopper and a possible wall, for example in the case of a sleeve of excessive length.

In one embodiment, the control mechanism is prevented from rotating by a pocket that constitutes a stop system, limiting the travel of the control mechanism, between the closed position and the open position.

Since the pipe guides the liquid immediately after the sealing zone, the retention of said liquid inside the various elements of the device, with the exception of the pipe, is minimized. Furthermore, the absence of any obstacle in the pipe works in favor of a streamlined flow, which makes it possible to avoid the drawbacks associated with a turbulent flow, for example splashing or aeration of the liquid.

The device comprises a system of locking/unlocking the pipe. This system has the advantage of making possible an assembly/disassembly that is particularly easy and quick to perform. Since the locking is obtained by rigid contact, the latter is very secure. Further, it does not require threading or a channel that makes cleaning difficult. After using the tap, the pipe can be removed by performing the same operation as for its use, but in the opposite direction. It can then be cleaned, so that the following sample collection is not distorted by the presence of residue of the liquid that has been in contact with the air. Possible solid bodies can also be removed in this way. The removal of the pipe also makes it possible for the operator to reach all of the areas of the body for an optimal cleaning.

In one embodiment, the pipe is replaced with a tool designed in a manner similar to the pipe, for example equipment for measuring or for processes.

The invention is a practical and economical alternative to the tasting taps that currently exist on the market.

In particular, it makes it possible to reduce the frequency of cleaning operations by its stopper system that makes it possible to flush out the particles and to push or shear off the solid bodies that can clog the tap. Moreover, its removable pipe system facilitates these cleaning operations.

Also, the attachment of the device to a container such as a wine vat can be done by existing means already on the market, for example smooth or threaded sleeves.

BRIEF DESCRIPTION OF THE FIGURES

The invention will be better understood from reading the following description and from examining the figures that accompany it. These figures are presented only by way of example and are in no way limiting of the invention.

DETAILED DESCRIPTION

In the description, the terms "high," "low," "upper," "lower," "horizontal," "vertical," "front," "rear" must be understood in the common meaning that would be given to them by a user of the tap who has to use said tap, i.e., once the device is assembled in closed position and attached to a container such as a vat. The closed position idea is specified below.

To clarify these ideas below, an orthonormal reference (Oxyz) is defined.

The axis (Ox) has a horizontal direction. Its direction vector is directed toward the outside of the container, perpendicular to the part of the container receiving the device.

The axis (Oz) has a vertical direction. Its direction vector is oriented upward.

A "front" face, or a "rear" face, must be understood as being a surface having its normal oriented in the direction of the ascending, or descending, abscissas x.

A "front" part of an element, or a "rear" part, must be understood as being a part whose constituent points have higher, or lower, abscissas x than those of the constituent points of a "rear," or "front," part of the same element.

An "upper" part of an element, or a "lower" part, must be understood as being a part whose constituent points have "higher," or "lower," height levels z than those of the constituent points of a "lower," or "higher," part of the same element.

A first element will be "ahead" of a second element if the constituent points of said first element have abscissas that are lower overall than those of the constituent points of said second element.

In the description, unless otherwise indicated, the device will be described in closed position. The closed position idea is specified below.

Figure 1:
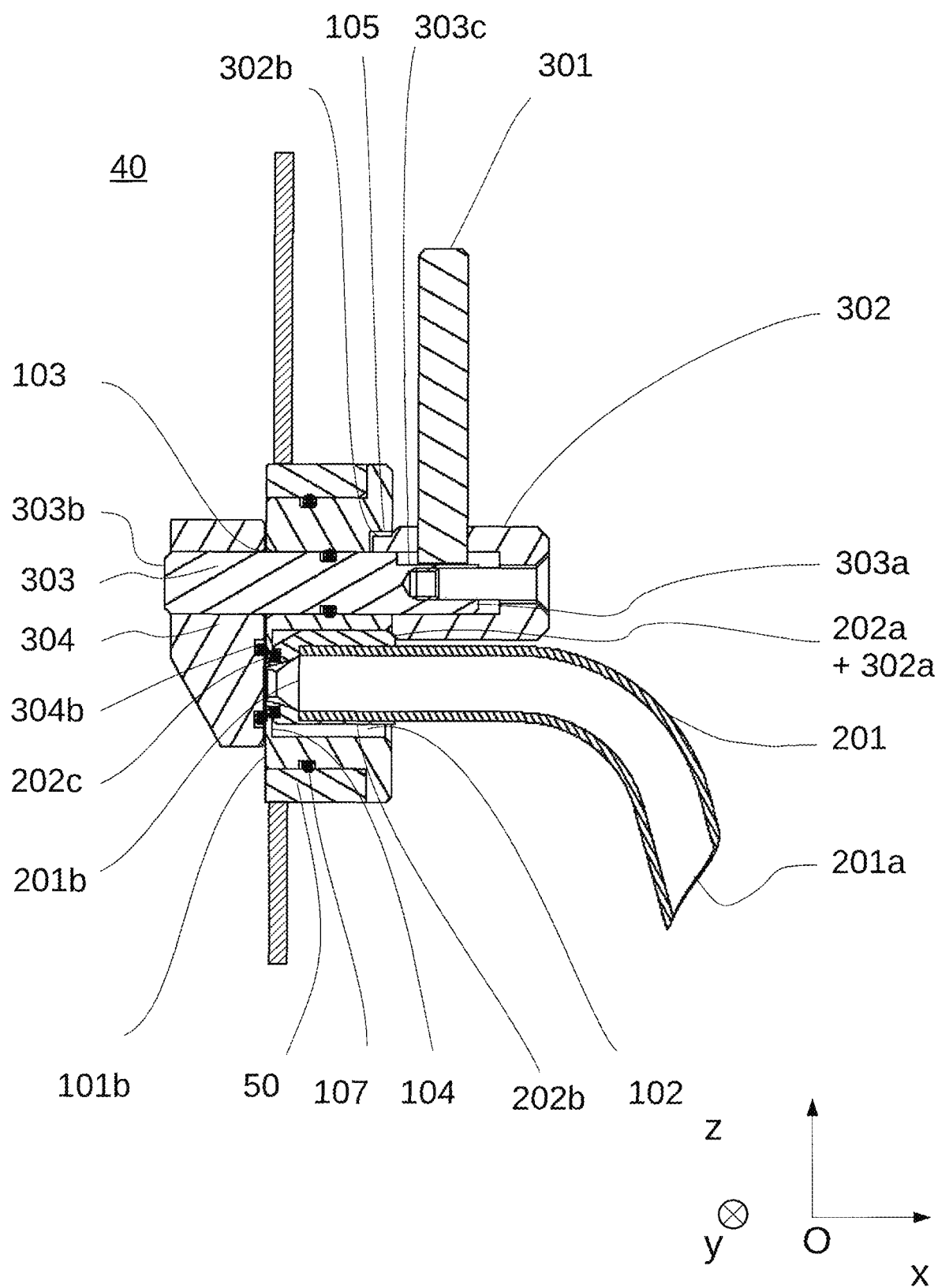
FIG. 1 is a vertical cutaway, normal (Oy), of a first embodiment of the invention used on a vat.

The device according to the invention, as illustrated in FIG. 1, has:

a body 10;

a pipe 20;
a control mechanism 30.

The body 10 has a front face 101a and a rear face 101b. In the examples of embodiment of FIGS. 1 to 3, the body 10 consists of a front part and a rear part that are each approximately cylindrical, with a circular section, with a longitudinal axis that is essentially merged with a longitudinal axis of the body 10 that is parallel to the axis (Ox). The diameter of the rear part is slightly less than that of the front part.

Regardless of the embodiment, the body 10 is designed to block in an airtight manner an opening made in a vat, the rear face 101b being located inside the vat and the front face 101a on the outside of the vat when the body is placed on the vat.

An approximately cylindrical pipe hole 102 and a shaft hole 103 having an axis of revolution pass through the body 10. In the nonlimiting examples of embodiment of FIGS. 1 to 3, the shaft hole 103 and pipe hole are cylindrical with a circular section, and each of the axes of revolution of the pipe holes 102 and shaft hole 103 is approximately parallel to the axis (Ox). In the immediate proximity of the rear face 101b of the body 10, the diameter of the pipe hole 102 is slightly reduced to form a stop 104, which is located at a stop distance $L_b$ from the front face 101a of said body.

Figure 2:
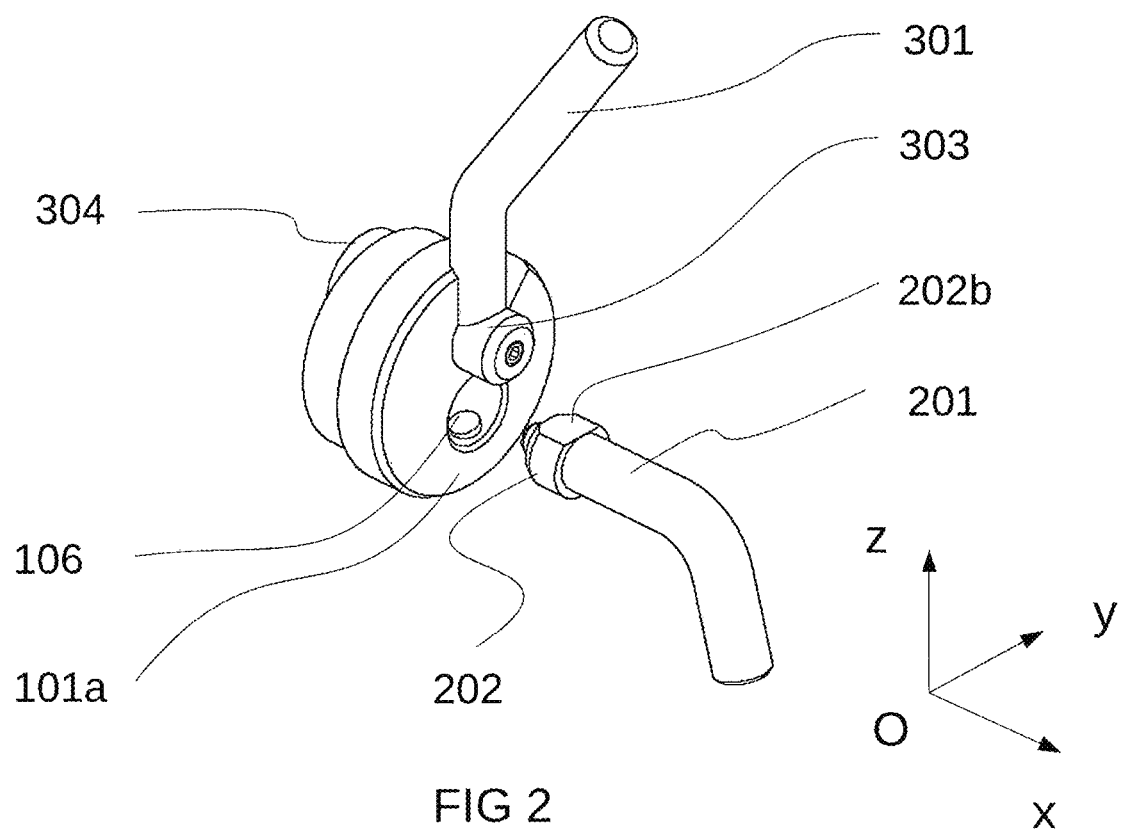
FIG. 2 is an isometric front view from above of a second embodiment of the invention.

In an embodiment illustrated in FIG. 2, the pipe hole 102 also comprises on its inner surface a projecting locking stud 106.

In an embodiment not shown here, the pipe hole 102 is conical.

Below, denoted as $R_{102}$ and $R_{103}$ are the respective radii of the pipe hole 102 and shaft hole 103 in the area of the rear face 101b, and e is the axial distance between the axes of said holes.

The pipe 20 has a tubular part 201 and an end fitting 202. According to an embodiment that can be seen in FIG. 1, the tubular part 201 and the end fitting 202 are two separate parts.

The tubular part 201 has, from a rear end 201b, a straight part of minimal length $L_b$.

Advantageously, the tubular part 201 has a tapered tip 201a, which makes it possible to limit the retention of liquid inside the pipe 20 when the tap is used.

In the nonlimiting embodiment illustrated in FIG. 1, the tubular part 201 has a straight part and then an elbow making it possible, during use of the invention, to guide the flow of a liquid, for example wine, from a container to a receptacle, for example from a vat to a glass.

The end fitting 202 has an overall toroidal shape and is attached to the rear end 201b of the tubular part 201. The outside diameter of the end fitting 202 is slightly less than that of the pipe hole 102 of the body 10, so as to make possible its insertion into said pipe hole. Furthermore, the end fitting 202 has on a front part a pipe border chamfer 202a as well as a pipe flat area 202b.

Figure 10A:
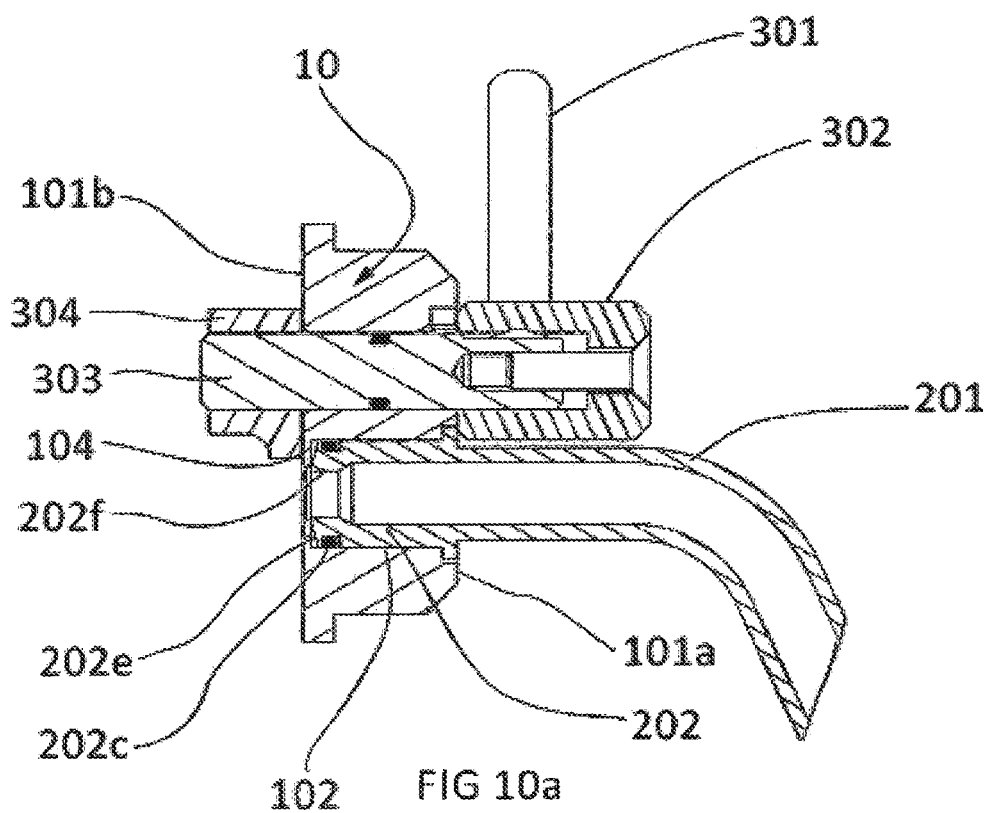
FIG. 10a is a cutaway along the line A-A of the tasting tap that is visible in FIG. 9 in the locked state.
Figure 10B:
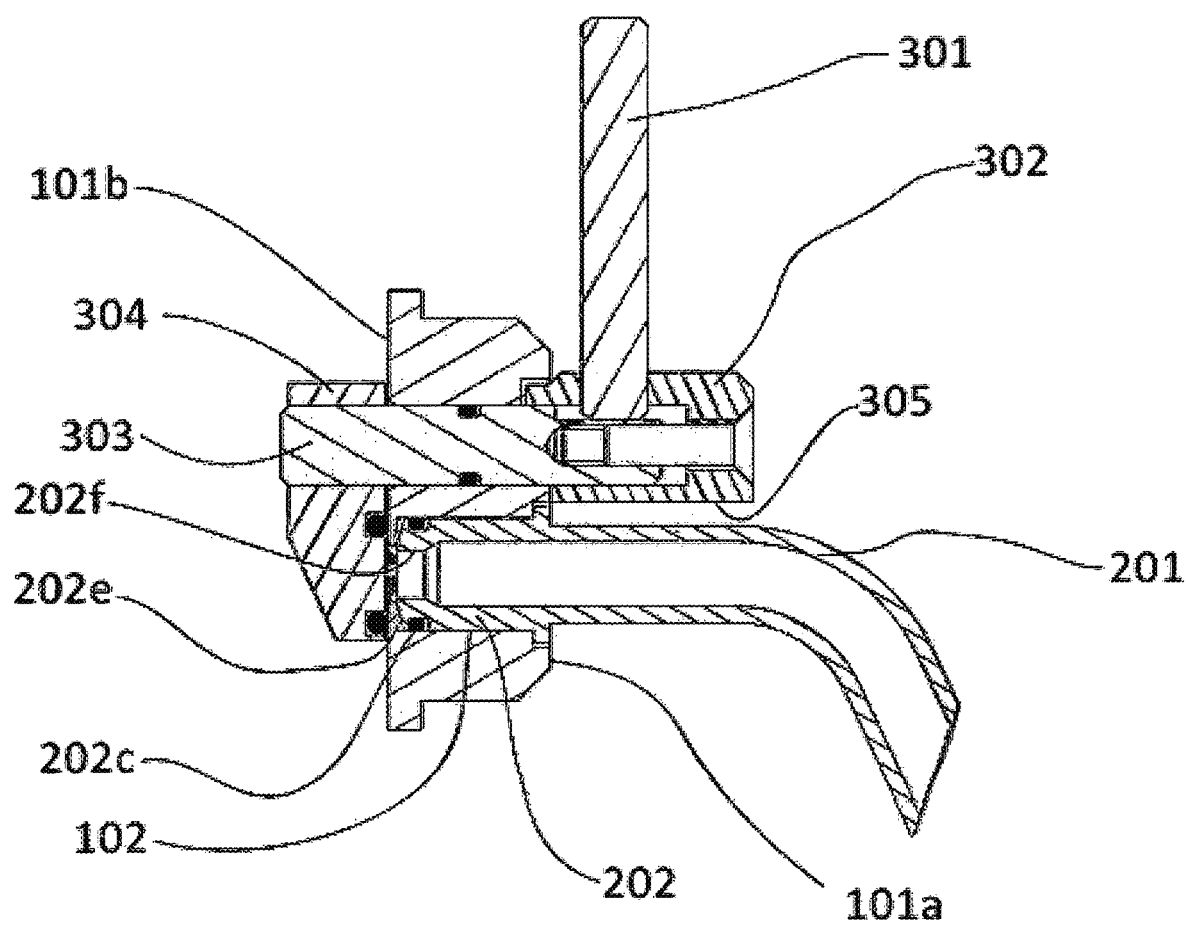
FIG. 10b is a cutaway along the line A-A of the tasting tap that is visible in FIG. 9 in the unlocked state.

As illustrated in FIGS. 1, 10a and 10b, the end fitting 202 has a rear face 202e that works with the stop 104. According to an embodiment that can be seen in FIG. 1, the rear face 202e is flat and perpendicular to the axis of the end fitting 202. According to another embodiment in FIGS. 10a and 10b, the rear face 202e is slightly conical.

Regardless of the embodiment, the rear face 202e comprises a through hole 202f that is designed to ensure the continuity between the tubular part 201 and the pipe hole 102.

A circular pipe end seal 202c is used on a rear part of the end fitting 202. According to an embodiment that can be seen in FIG. 1, the pipe end seal 202c is positioned in a groove provided on the rear face 202e of the end fitting 202 around the through hole 202f.

According to another embodiment that can be seen in FIGS. 10a and 10b, the pipe end seal 202c is positioned on the cylindrical part of the end fitting 202, in the immediate proximity of the rear face 202e.

The fact of positioning the pipe end seal 202c as close as possible to the portion of the pipe hole 102 that is present in the area of the stop 104 makes it possible to reduce the amount of liquid retained in the tap after the removal of the pipe 20.

In the embodiment not shown here in which the pipe hole 102 is conical, the end fitting 202 also has a conical shape.

In an embodiment that can be seen in FIGS. 10a and 10b, the tubular part 201 and the end fitting 202 form only a single part. The end fitting 202 then constitutes a shoulder of the pipe 20.

In the embodiment of FIG. 1, the control mechanism 30 comprises:
a lever 301;
a cap 302;
a shaft 303;
a stopper 304.

The shaft 303 is approximately cylindrical and with a circular section, with dimensions that are slightly less than those of the shaft hole 103 of the body 10 to be able to be inserted in said shaft hole. The shaft 303 has on a front end 303a a shaft flat area 303c whose normal vector is oriented upward.

The lever 301, as illustrated in FIG. 1, is a rigid piece having at least one cylindrical part, a flat end of which can be flattened against the shaft flat area 303c of the shaft 303. The lever 301 is shrink-fitted to the cap 302, which is attached to the front end 303a of the shaft 303 and has on a rear part a cap border chamfer 302a as well as a projecting stud 302b on an upper part of its rear face.

The stopper 304 is an elongated rigid piece having a length $L_g$ that is strictly greater than a minimum length $L_0$ and a width $l_g$ that is strictly greater than a minimum width $l_0$, with:

$$L_0 = R_{102} + R_{103} + e$$

$$l_0 = 2*\text{Max}(R_{102}; R_{103})$$

In the example of embodiment of FIG. 1, the stopper 304 is a rigid piece with an overall oblong contour; in the example of embodiment of FIGS. 7a to 7d, said stopper has a rectangular parallelepiped shape.

Furthermore, the stopper 304 has a circular off-center hole 304a with a diameter that is approximately identical to the diameter of the shaft 303 so that said stopper is attached by shrink-fitting to a rear end 303b of said shaft. Other methods of attachment, such as, for example, screwing, welding and attaching by pin, can also be envisaged. The stopper 304 also has a circular stopper seal 304b, with a diameter slightly greater than the diameter of the pipe hole 102 in the area of the rear face 101b of the body 10.

Figure 4A:
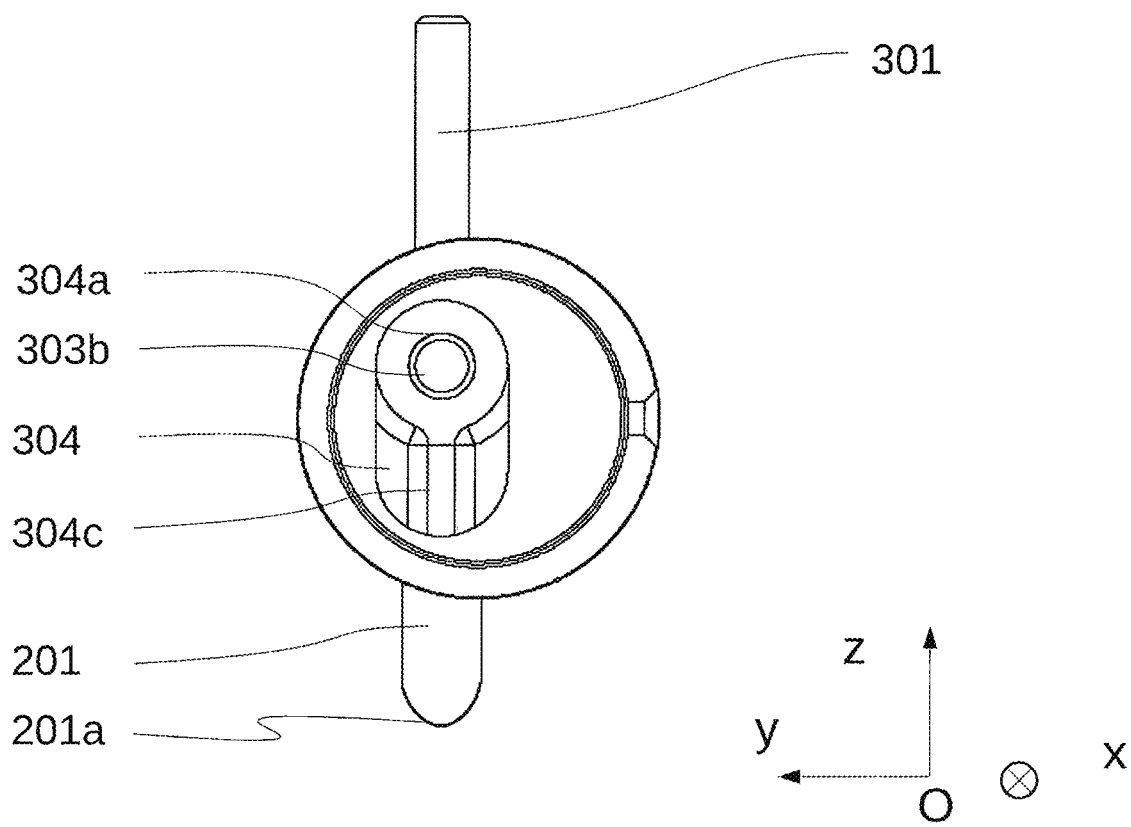
FIG. 4a is a rear view of the embodiment of FIG. 1 in closed position.
Figure 4B:
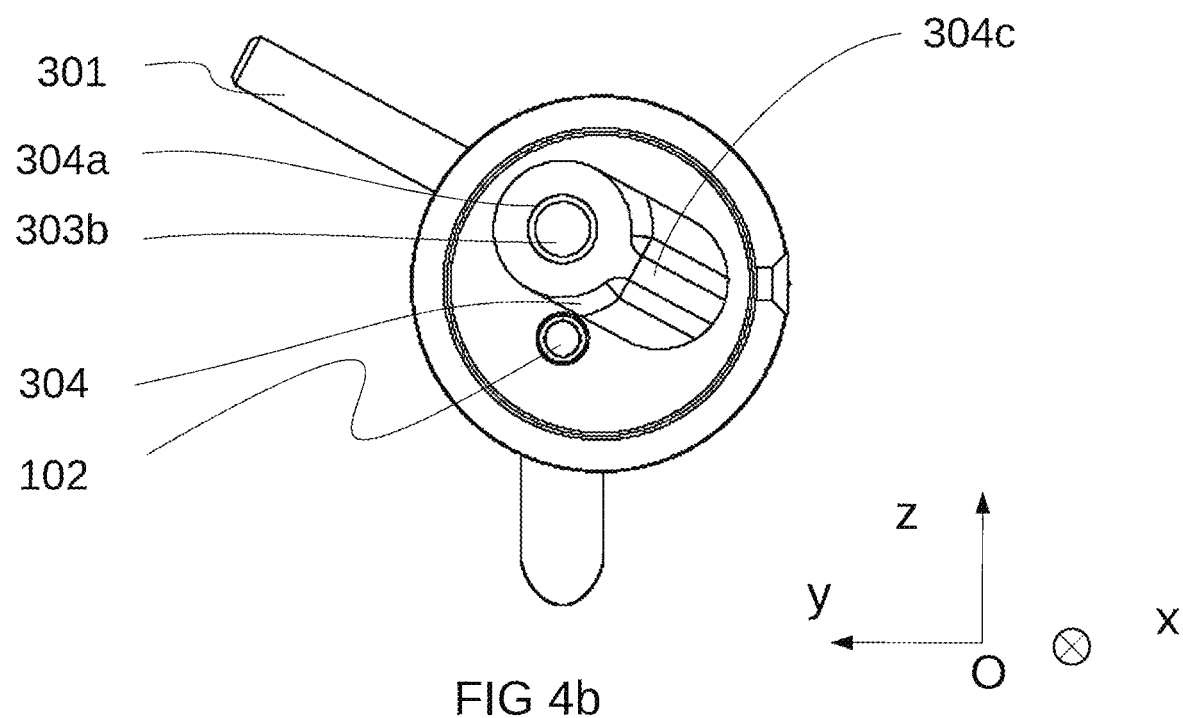
FIG. 4b is a rear view of the embodiment of FIG. 1 in open position.
Figure 8:
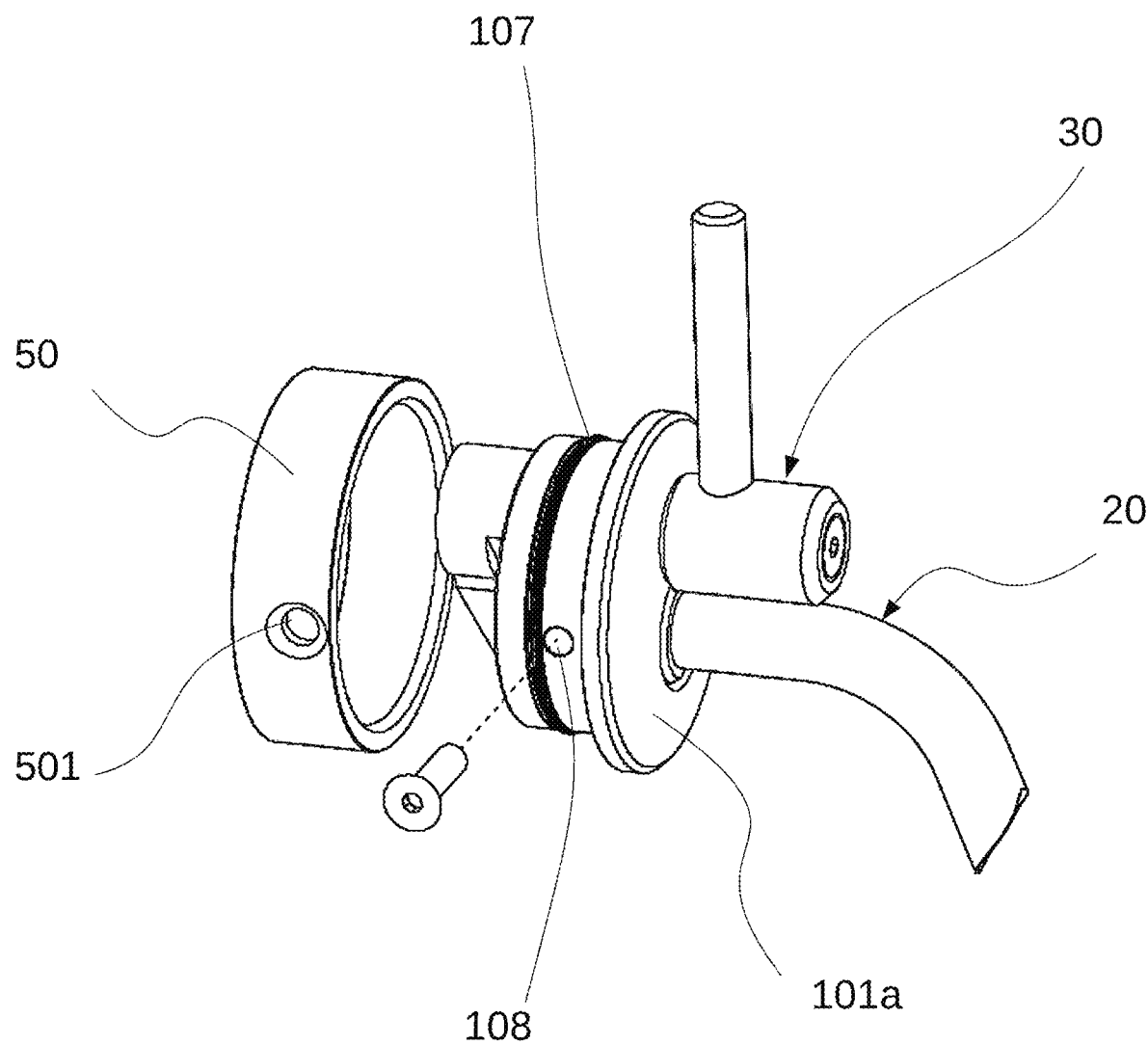
FIG. 8 is an isometric side view of the embodiment of FIG. 1 in which the device according to the invention is designed to be fitted into a smooth sleeve.

In the example of embodiment of FIG. 1, included in FIGS. 4a, 4b and 8, the stopper 304 also has a rim 304c.

When using the device, the shaft 303, the stopper 304, the body 10 and the pipe 20 are made to be in contact with a liquid.

Advantageously, the entire device is made of a rustproof material, for example stainless steel or a polymer material, to minimize troublesome chemical phenomena such as corrosion.

When the control mechanism 30 and the body 10 are assembled together by means of the shaft 303 and the shaft hole 103, the entire control mechanism 30 is able to be put into a movement of rotation around the axis of said shaft. The translation of the control mechanism 30 vis-à-vis the body 10 is impeded by the stopper 304, on the one hand, which comes into contact with the rear face 101b of the body 10, and by the cap 302, on the other hand, which comes into contact with the front face 101a of said body.

In the device according to the invention, the length of the stopper 304 is sufficient to ensure that, once the control mechanism 30 is assembled with the body 10, said stopper can entirely block the pipe hole 102.

Figure 5A:
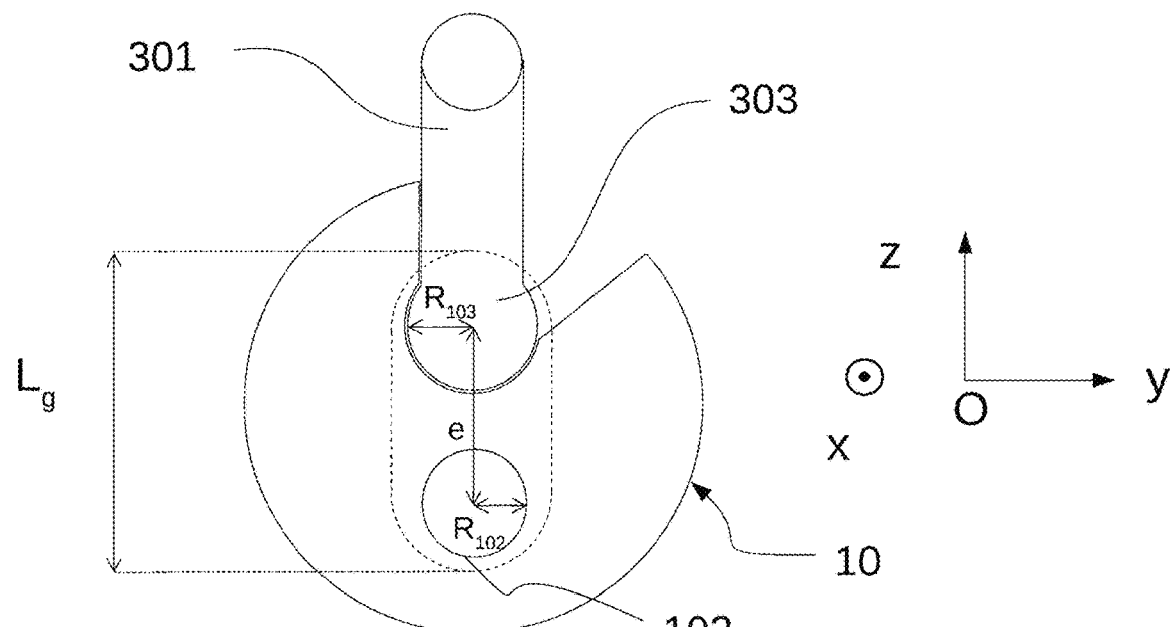
FIG. 5a is a vertical section, normal (Ox), of the embodiment of FIG. 2 of the invention, in the absence of a pipe, in closed position, the dashed line representing the projection of the stopper on the section plane.
Figure 5B:
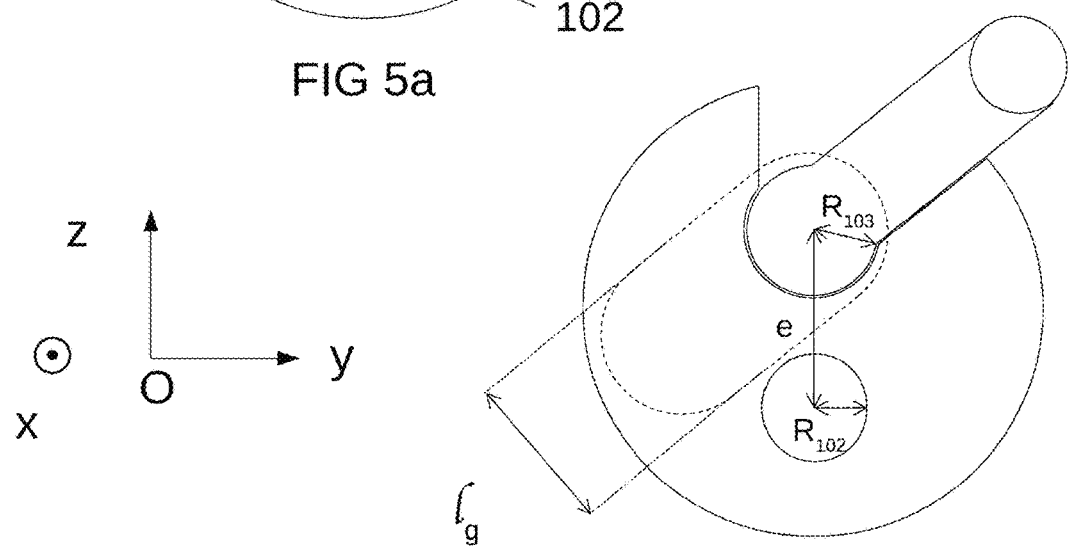
FIG. 5b is a vertical section, normal (Ox), of the embodiment of FIG. 2 of the invention, in the absence of a pipe, in open position, the dashed line representing the projection of the stopper on the section plane.
Figure 5C:
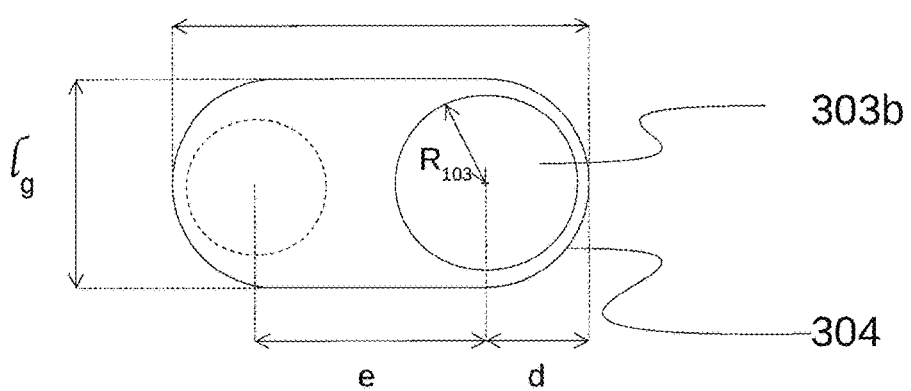
FIG. 5c is a front view of the stopper showing its principal dimensions, the dashed line representing the projection on the section plane of the shape of the pipe hole in the area of the rear face of the body when the stopper is assembled to the rest of the device according to the invention.

For this, the off-center hole 304a is positioned in such a way that the following condition is confirmed:

$$R_{103} \leq d \leq L_g - L_0 + R_{103}$$

where d is the distance between the center of the circular off-center hole 304a and the distal end of the stopper 304 closest to said center, as illustrated in FIG. 5c.

Below, the device according to the invention will be described in:
- closed position when the stopper 304 totally blocks the pipe hole 102 of the body 10;
- intermediate position when said stopper partially blocks said pipe hole;
- open position when said stopper does not at all block said pipe hole.

In the example of embodiment illustrated in FIG. 1, the stud 302b can be introduced into a pocket 105 of the body 10, said pocket being a recessed part of said body. The shape of the pocket 105 depends on the shape of the stud 302b and corresponds to the impression left by said stud in the body 10 when the control mechanism 30 is inserted into the shaft hole 103 of said body and then driven in rotation from a closed position to an open position of the device according to the invention, as defined previously. The body 10 then itself becomes a stop for the stud 302b, thus limiting the movement of rotation of the control mechanism 30.

Figure 3:
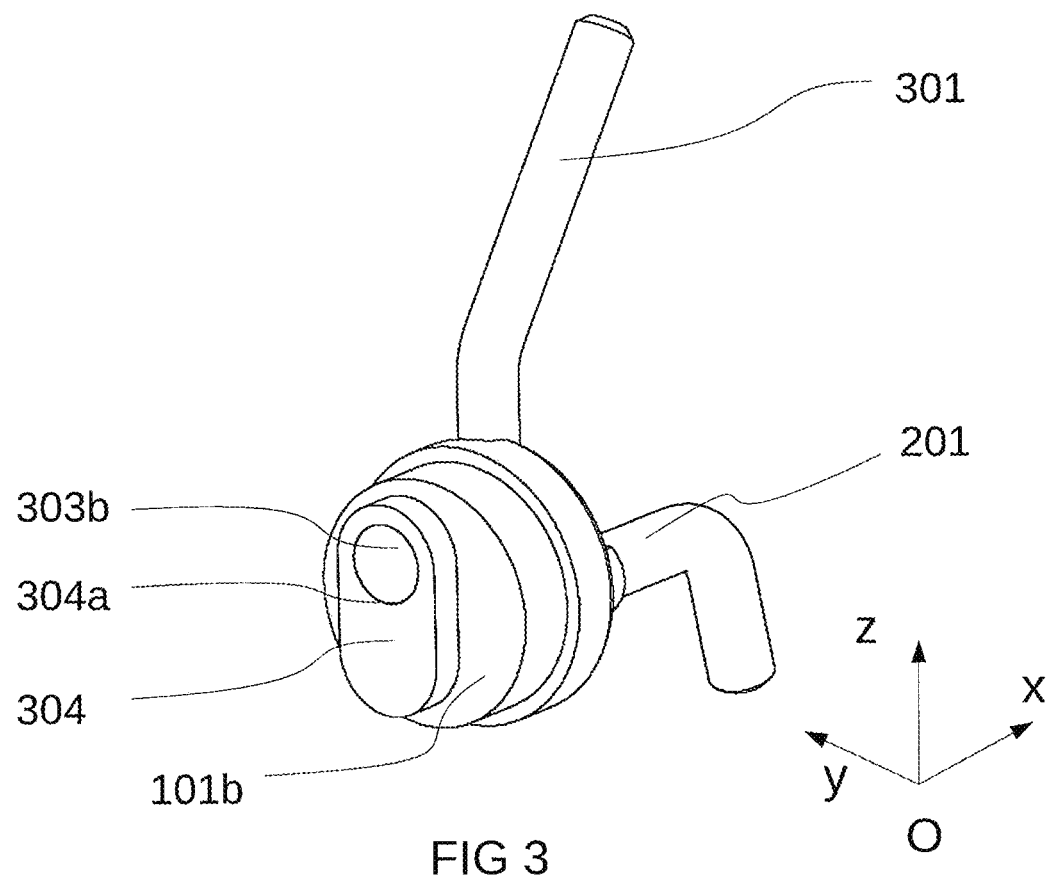
FIG. 3 is an isometric rear view from above of the embodiment of FIG. 2 of the invention.

In the example of embodiment of FIGS. 2 and 3, it is the lever 301 that performs the technical function of the stud 302b. Once the control mechanism 30 is assembled with the body 10, the lever 301 is found slightly in front of the front face 101a of the body 10. The pocket 105 then corresponds to the impression left by the lever 301 in the body 10 when the control mechanism 30 is driven in rotation from a closed position to an open position of the device according to the invention, as seen previously.

Regardless of the embodiment, the control mechanism 30 comprises:
- a shaft 303 that is mounted to pivot in the shaft hole 103 of the body 10 so as to pass through the body 10,
- a stopper 304 that is movable between a closed position when the stopper 304 totally blocks the pipe hole 102 of the body 10 and an open position when said stopper does not at all block said pipe hole 102, the stopper 304 being connected to the shaft 303 so as to be flattened against the rear face 101b of the body 10,
- a controller designed to cause the shaft 303 that is positioned in the area of the front face 101a of the body 10 to pivot.

In the embodiment of FIG. 1, the pipe hole 102 and the shaft hole 103 are located close enough to one another to ensure that the cap 302 extends slightly beyond said pipe hole. The assembling of the pipe 20 on the body 10 is then done by orienting the pipe flat area 202b upward, so as to be able to insert said pipe into the pipe hole 102. A rotation of the pipe 20 then makes it possible to lock said pipe by putting the pipe chamfer 202a and the cap chamfer 302a into contact. During this rotation, the contact between the pipe chamfer 202a and the cap chamfer 302a makes possible the compressing of the pipe end seal 202c, which ensures the seal between the pipe 20 and the body 10.

In the embodiment, not shown, in which the pipe hole 102 and the end fitting 202 are conical, a seal placed on the periphery of the end fitting makes it possible to ensure the sealing between the body 10 and the pipe 20.

Figure 6A:
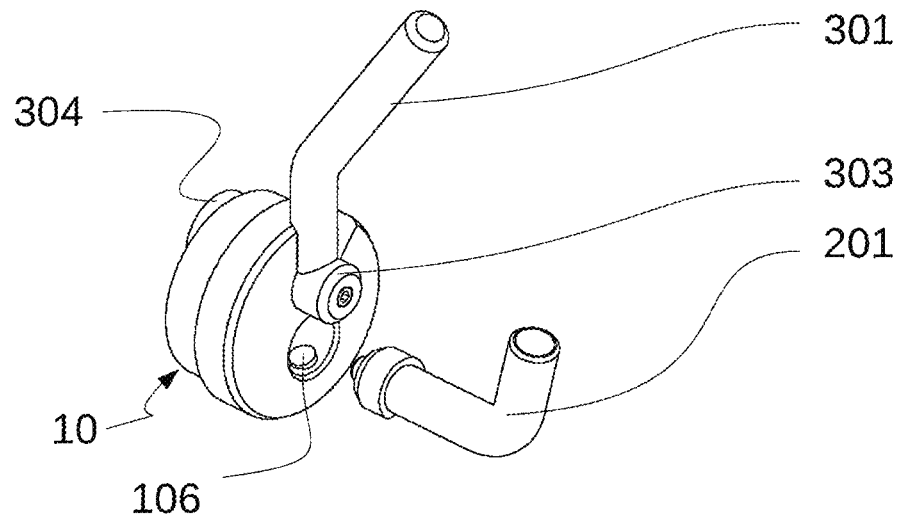
FIG. 6a is an isometric front view from above of the embodiment of FIG. 2 illustrating a first step of the assembly and of the locking of the pipe on the body.
Figure 6B:
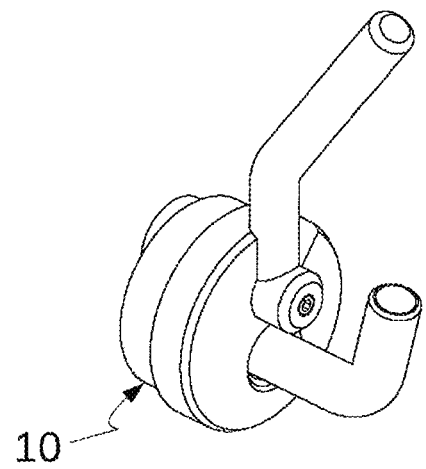
FIG. 6b is an isometric front view from above of the embodiment of FIG. 2 illustrating a second step of the assembly and locking of the pipe on the body.
Figure 6C:
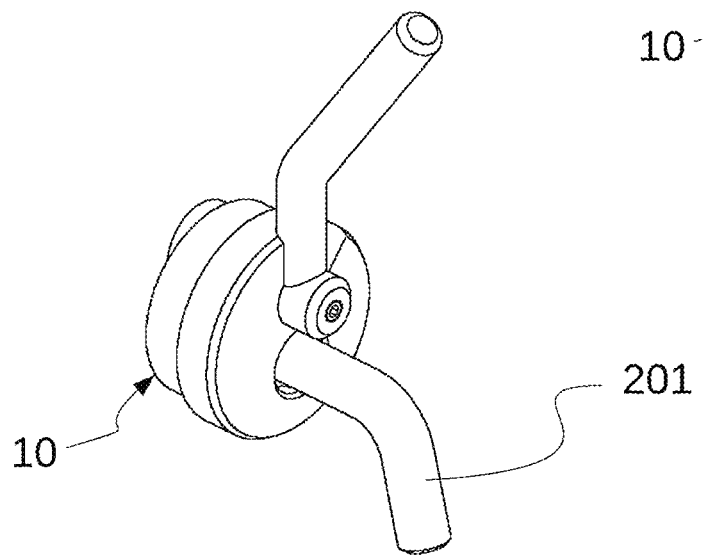
FIG. 6c is an isometric front view from above of the embodiment of FIG. 2 illustrating a third step of the assembly and locking of the pipe on the body.
Figures 7A, 7B:
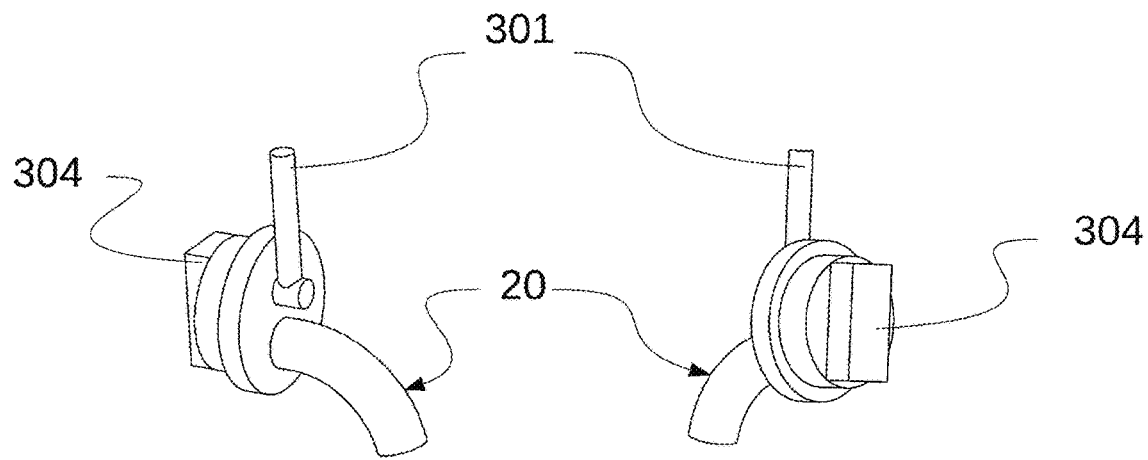
FIG. 7a is an isometric front view of a third embodiment of the invention in closed position, in which the stopper has the shape of a rectangular parallelepiped.
FIG. 7b is an isometric rear view of the embodiment of FIG. 7a in closed position.
Figures 7C, 7D:
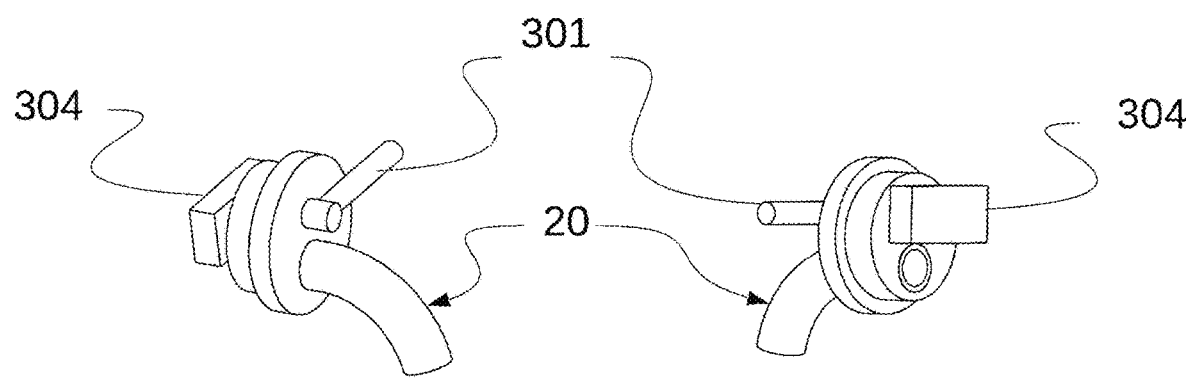
FIG. 7c is an isometric front view of the embodiment of FIG. 7a in open position.
FIG. 7d is an isometric rear view of the embodiment of FIG. 7a in open position.

In the embodiment of FIGS. 2 and 3, the steps for assembling the pipe 20 on the body 10 are illustrated in FIGS. 6a, 6b, and 6c.

In a first step, the pipe 20 is oriented so that the pipe flat area 202b is oriented downward, as illustrated in FIG. 6a. In this configuration, the pipe 20 can be inserted into the pipe hole 102, up to the stop 104, without the locking stud 106 constituting an obstacle. The device is then in the configuration of FIG. 6b. The pipe 20 is then turned around the axis of the pipe hole 102, so that the pipe flat area 202b is oriented upward. The pipe 20 is then blocked by the locking stud 106 that prevents said pipe from being removed from the pipe hole 102.

Figure 9:
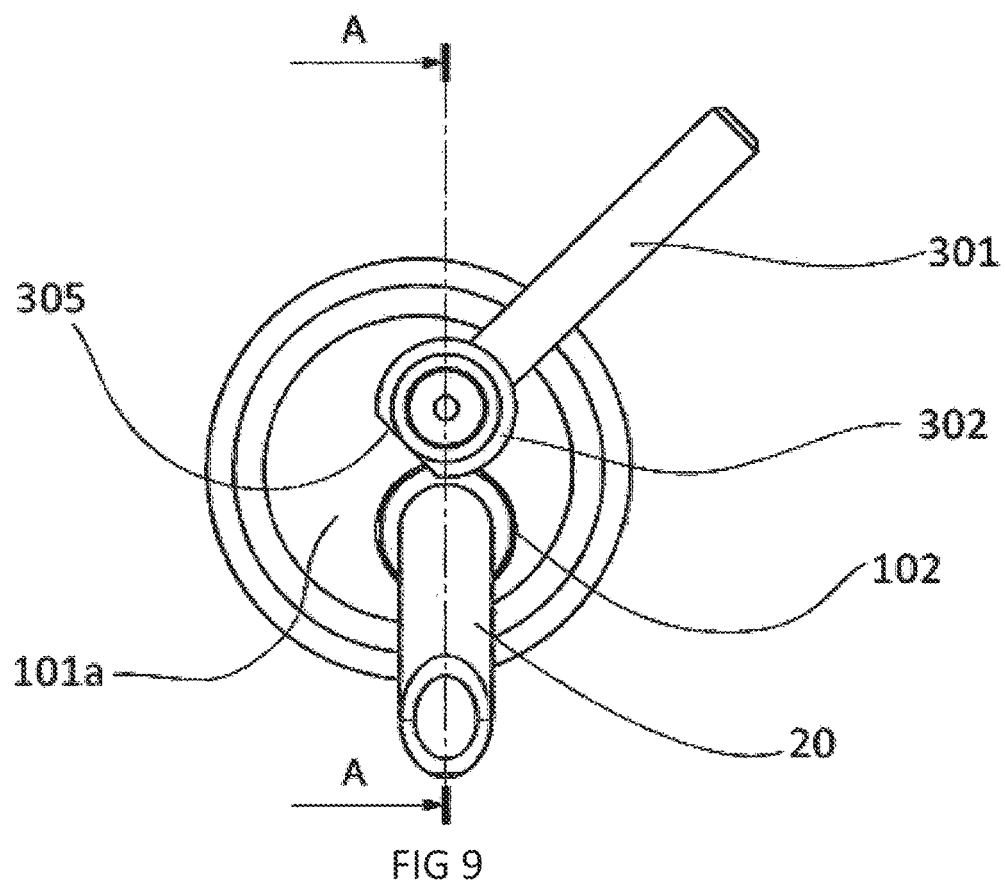
FIG. 9 is a front view of a tasting tap according to another embodiment.

According to another embodiment that can be seen in FIGS. 9, 10a and 10b, the control mechanism 30 comprises a cylindrical portion (the cap 302) that goes slightly beyond the pipe hole 102. This cylindrical portion comprises a controller flat area 305 that is designed to enable the introduction of the pipe 20 into the pipe hole 102.

Regardless of the embodiment, the tasting tap comprises a locking/unlocking mechanism designed to occupy a locked state in which it immobilizes the pipe 20 in the pipe hole 102 and an unlocked state in which it allows the removal of the pipe 20.

According to a variant, the locking/unlocking mechanism comprises a locking piece that is mobile in rotation against the front face 101a of the body around a pivoting axis that is perpendicular to the front face 101a between an unlocked position in which the locking piece does not interfere with the pipe hole 102 and a locked position in which the locking piece interferes with the pipe hole 102 so as to immobilize the pipe 20 in the pipe hole 102.

According to one embodiment, the locking piece is independent from the control mechanism 30.

According to another embodiment, the locking piece is a cylindrical portion, particularly the cap 302 of the control mechanism 30.

According to another variant, the locking/unlocking mechanism comprises a stationary locking piece positioned on the front face 101a of the body 10 and that interferes with the pipe hole 102 so as to immobilize the pipe 20 in the hole of the pipe 102. In addition, the pipe 102 comprises a pipe flat area 202b, the pipe flat area 202b and the stationary locking piece being sized in such a way that when the pipe flat area 202b is placed opposite the locking piece, the pipe 20 is no longer held in the pipe hole 102 and when the pipe flat area 202b is offset in relation to the locking piece, the pipe 20 is held in the pipe hole 102.

According to one embodiment, the locking piece is independent from the control mechanism 30.

According to another embodiment, the locking piece is a cylindrical portion, particularly the cap 302 of the control mechanism 30.

In an embodiment illustrated in FIG. 1, once the device according to the invention is assembled, it can be attached in closed position to a container 40 containing a liquid, for example a wine vat.

The device can, for example, be screwed into a threaded sleeve or a bulkhead fitting attached to the vat. It can also be welded to the vat.

It can also be fitted into a smooth sleeve 50, as illustrated in FIGS. 1 and 8. In this embodiment, the smooth sleeve 50 accommodates the rear part of the body 10 and comes to a stop against the front part whose diameter is slightly greater, as noted above. In this case, the sealing between the interior of the vat and the exterior is ensured by an O-ring 107. The angular orientation of the tap as well as its hold in position are then ensured by screwing of at least one bolt through a hole 501 of the smooth sleeve and a bolt slot 108 located on the periphery of the body 10, or by a system of pins.

In the embodiment of FIG. 1, once attached to the container 40, only the stopper 304, the rear end 303b of the shaft 303, and the rear face 101b of the body 10 are in contact with the liquid. Since the device is in closed position, in the example that is illustrated, the stopper 304 and the lever 301 are placed vertically, and said stopper entirely blocks the pipe hole 102 into which the pipe 20 has been inserted and then locked. The bolt attaching the cap 302 to the shaft 303 exerts a pull on said shaft, thus compressing the stopper seal 304b against the rear face 101b of the body 10, on the periphery of the pipe hole 102, thus ensuring the sealing between the device and the interior of the container 40. In particular, it is possible to compensate for the wear of the stopper seal 304b by tightening the bolt, causing a greater compression of said stopper seal.

The control mechanism 30 is then driven in rotation in an opening direction by an operator working the handle. According to the lever arm principle, the larger the lever 301, the more the rotation is facilitated.

The rotation is made possible by the pivot connection existing between the control mechanism 30 and the body 10, as well as by the pocket 105 that allows the movement of the stud 302b, or, if applicable, of the lever 301. The rotation of the control mechanism 30 drives the rotation of the stopper 304 that is integral with it, unblocking the pipe hole 102 into which the pipe 20 is inserted. The opening that is thus unblocked makes possible the flow of the liquid from the container 40 through the pipe 20, said pipe guiding the liquid to the outlet opening beyond which the liquid is recovered in a container, for example a glass.

The flow of the liquid can be adjusted by turning the control mechanism 30 varying degrees, causing a more or less considerable unblocking of the pipe hole 102. The device is then able to change from a closed position, corresponding to an absence of flow of liquid, to an open position, corresponding to a maximum flow, passing by intermediate positions corresponding to flows of varying degrees according to the opening that is unblocked. The maximum flow is attained when the stud 302b, or, if applicable, the lever 301, comes to a stop against the body 10 when the device changes from a closed position to an open position.

Since the pipe 20 guides the liquid immediately after the sealing zone, the retention of said liquid inside the various elements of the device, other than said pipe, is minimized. Furthermore, the absence of any obstacle in the pipe 20 acts in favor of a streamlined flow, which makes it possible to avoid drawbacks associated with a turbulent flow, for example splashing or aeration of the liquid.

Advantageously, so as to facilitate the flow of the liquid and to limit its retention in the pipe hole 102, said pipe hole is slightly inclined in relation to the body 10, downward in the direction of the flow of said liquid.

When a desired sample of liquid has been taken, the operator turns the handle in a closing direction, opposite to the opening direction, to bring, according to a process similar to the opening process, the stopper 304 back into an initial position, thereby blocking the entire pipe hole 102 and thus stopping the flow of the liquid.

During the closing process, the stopper 304 in its movement of rotation flushes the particles that could clog the tap. If certain solid bodies, for example skins and grape seeds or canes, are engaged in the pipe hole 102, they are pushed or sheared off by the stopper 304 to the extent that they do not exceed a threshold mechanical strength that depends in particular on the shape and on the material used to manufacture said stopper.

In an embodiment corresponding to the embodiment of FIG. 1, the stopper 304 has a rim 304c that, when said stopper is moved in opening or in closing, puts the liquid in motion to flush the solid bodies more effectively than in the absence of a rim. In this embodiment, the reduction in the thickness of the stopper also makes it possible to prevent the accumulation of solid particles between the stopper and a possible wall, for example in the case of an excessively long sleeve.

After using the tap, the pipe 20 can be removed by performing the same operation as for its use, but in the reverse direction.

Once removed, the pipe 20 can be cleaned, so that the next sampling is not distorted by the presence of residue of the liquid that has been in contact with the air. Possible solid bodies can also be removed in this way. The removal of the pipe 20 also makes it possible for the operator to access all of the areas of the body 10 for an optimal cleaning.

Owing to its design, the device according to the invention is suitable for tools other than the pipe 20, for example equipment for measurements or for processes insofar as they can be adapted in a manner similar to the pipe 20 on the device.

The invention claimed is:

1. A tasting tap attached to a container (40) of a liquid, comprising:
    a body (10), by which said tap is attached to said container, through which a pipe hole (102) and a shaft hole (103) pass, each having an axis of revolution;
    a control mechanism (30) that has:
        a shaft (303) that is mounted to pivot in the shaft hole (103) of the body (10) in such a way as to pass through the body (10),
        a stopper (304) that is movable between a closed position when the stopper (304) totally blocks the pipe hole (102) of the body (10) and an open position when said stopper does not at all block said pipe hole (102), the stopper (304) being connected to the shaft (303) so as to be flattened against a rear face (101b) of the body (10),
        a controller designed to cause the shaft (303) that is positioned in the area of a front face (101a) of the body (10) to pivot;
    a removable pipe (20) having dimensions that are slightly less than those of the pipe hole (102) of said body, able to be inserted into said pipe hole, and having a tubular part (201), the pipe hole (102) having a reduction in diameter to form a stop (104) against which the pipe (20) abuts;
    a locking/unlocking mechanism designed to occupy a locked state in which it immobilizes the pipe (20) in the pipe hole (102) and an unlocked state in which it allows the removal of the pipe (20), wherein the pipe (20) has a straight part that is extended by an elbow.

2. The tasting tap according to claim 1, wherein the locking/unlocking mechanism comprises a locking piece that is mobile in rotation against the front face (101a) of the body (10) around a pivoting axis that is perpendicular to the front face (101a) between an unlocked position in which the locking piece does not interfere with the pipe hole (102) and a locked position in which the locking piece interferes with the pipe hole (102) so as to immobilize the pipe (20) in the pipe hole (102).

3. The tasting tap according to claim 2, wherein the locking piece is a cylindrical portion (302) of the control mechanism (30).

4. The tasting tap according to claim 3, wherein the cylindrical portion (302) of the control mechanism comprises a chamfer (302a) designed to work with a pipe chamfer (202a) provided in the area of the pipe (20).

5. The tasting tap according to claim 1, wherein the locking/unlocking mechanism comprises a stationary locking piece positioned on the front face (101a) of the body (10) and that interferes with the pipe hole (102), and a pipe flat area (202b) provided on the pipe (20), the pipe flat area (202b) and the stationary locking piece being sized in such a way that when the pipe flat area (202b) is placed opposite the locking piece, the pipe (20) is not held in the pipe hole (102), and when the pipe flat area (202b) is offset in relation to the locking piece, the pipe (20) is held in the pipe hole (102).

6. The tasting tap according to claim 5, wherein the locking piece is a cylindrical portion (302) of the control mechanism (30).

7. The tasting tap according to claim 1, wherein the pipe (20) has on a rear end (201b) an end fitting (202) and a pipe end seal (202c) positioned near a portion of the pipe hole (102) present in the area of the stop (104), designed to ensure the sealing between the pipe (20) and the body (10).

8. The tasting tap according to claim 7, wherein the end fitting (202) comprises a rear face (202e) designed to work with the stop (104) and that comprises a groove to house the pipe end seal (202c).

9. The tasting tap according to claim 7, wherein the end fitting (202) comprises a rear face (202e) designed to work with the stop (104) and wherein the pipe end seal (202c) is positioned on a cylindrical part of the end fitting (202), in the immediate vicinity of the rear face (202e).

10. The tasting tap according to claim 1, wherein:
the shaft hole (103) is cylindrical with a circular section;
a cap (302), forming a sliding connection with the shaft (303), is screwed to a front end (303a) of said shaft along an axis that is parallel to the axis of revolution of the cylindrical shaft hole (103) with a circular section.

11. The tasting tap according to claim 10, wherein the control mechanism (30) has a lever (301) attached to the cap (302) or to the shaft (303) to facilitate putting said control mechanism in rotation.

12. The tasting tap according to claim 11, wherein the body (10) comprises a recessed part constituting a pocket (105) accommodating a part of the control mechanism (30) and forming a guide and a stop for the rotation of said control mechanism.

13. The tasting tap according to claim 12, wherein the part of the control mechanism (30) accommodated in the pocket (105) is the lever (301).

14. The tasting tap according to claim 10, wherein the body (10) comprises a recessed part constituting a pocket (105) accommodating a part of the control mechanism (30) and forming a guide and a stop for the rotation of said control mechanism, and wherein the cap (302) has a stud (302b) on its rear face, which stud constitutes the part of the control mechanism (30) accommodated in the pocket (105).

15. The tasting tap according to claim 1, wherein the pipe (20) comprises a tubular part (201) and an end fitting (202) that form only a single piece, said end fitting constituting a shoulder of the pipe (20).

16. The tasting tap according to claim 1, wherein:
the pipe hole (102) and a rear end (201b) of the tubular part (201) of the pipe (20) are appr ximatcly conical;
said rear end has a seal on its periphery to ensure the sealing between the body (10) and the pipe (20).

17. The tasting tap according to claim 1, wherein the stopper (304) has a stopper seal (304b) held by compression against a rear face (101b) of the body (10) and ensuring the sealing between the interior of the container (40) and the body (10).

18. The tasting tap according to claim 1, wherein the stopper (304) has a rim (304c).

19. A tasting tap attached to a container (40) of a liquid, comprising:
a body (10), by which said tap is attached to said container, through which a pipe hole (102) and a shaft hole (103) pass, each having an axis of revolution;
a control mechanism (30) that has:
a shaft (303) that is mounted to pivot in the shaft hole (103) of the body (10) in such a way as to pass through the body (10),
a stopper (304) that is movable between a closed position when the stopper (304) totally blocks the pipe hole (102) of the body (10) and an open position when said stopper does not at all block said pipe hole (102), the stopper (304) being connected to the shaft (303) so as to be flattened against a rear face (101b) of the body (10),
a controller designed to cause the shaft (303) that is positioned in the area of a front face (101a) of the body (10) to pivot;
a removable pipe (20) having dimensions that are slightly less than those of the pipe hole (102) of said body, able to be inserted into said pipe hole, and having a tubular part (201), the pipe hole (102) having a reduction in diameter to form a stop (104) against which the pipe (20) abuts;
a locking/unlocking mechanism designed to occupy a locked state in which it immobilizes the pipe (20) in the pipe hole (102) and an unlocked state in which it allows the removal of the pipe (20),
wherein the pipe (20) has on a rear end (201b) an end fitting (202) and a pipe end seal (202c) positioned near a portion of the pipe hole (102) present in the area of the stop (104), designed to ensure the sealing between the pipe (20) and the body (10).

20. A tasting tap attached to a container (40) of a liquid, comprising:
a body (10), by which said tap is attached to said container, through which a pipe hole (102) and a shaft hole (103) pass, each having an axis of revolution;
a control mechanism (30) that has:
a shaft (303) that is mounted to pivot in the shaft hole (103) of the body (10) in such a way as to pass through the body (10),
a stopper (304) that is movable between a closed position when the stopper (304) totally blocks the pipe hole (102) of the body (10) and an open position when said stopper does not at all block said pipe hole (102), the stopper (304) being connected to the shaft (303) so as to be flattened against a rear face (101b) of the body (10),
   a controller designed to cause the shaft (303) that is positioned in the area of a front face (101a) of the body (10) to pivot;
a removable pipe (20) having dimensions that are slightly less than those of the pipe hole (102) of said body, able to be inserted into said pipe hole, and having a tubular part (201), the pipe hole (102) having a reduction in diameter to form a stop (104) against which the pipe (20) abuts;
a locking/unlocking mechanism designed to occupy a locked state in which it immobilizes the pipe (20) in the pipe hole (102) and an unlocked state in which it allows the removal of the pipe (20),
wherein the locking/unlocking mechanism comprises a locking piece that is mobile in rotation against the front face (101a) of the body (10) around a pivoting axis that is perpendicular to the front face (101a) between an unlocked position in which the locking piece does not interfere with the pipe hole (102) and a locked position in which the locking piece interferes with the pipe hole (102) so as to immobilize the pipe (20) in the pipe hole (102).

* * * * *